(12) United States Patent
Lee et al.

(10) Patent No.: US 8,350,504 B2
(45) Date of Patent: Jan. 8, 2013

(54) BRUSHLESS DC MOTOR DRIVING SYSTEM

(75) Inventors: Teng-Hui Lee, Sanchong (TW);
Wei-Chih Chen, Sanchong (TW)

(73) Assignee: Amtek Semiconductor Co., Ltd., Taipei County (TW)

( * ) Notice: Subject to any disclaimer, the term of this patent is extended or adjusted under 35 U.S.C. 154(b) by 429 days.

(21) Appl. No.: 12/782,979

(22) Filed: May 19, 2010

(65) Prior Publication Data
US 2011/0202941 A1    Aug. 18, 2011

(30) Foreign Application Priority Data
Feb. 12, 2010   (TW) ................................ 99104527 A

(51) Int. Cl.
*H02P 6/14*    (2006.01)
(52) U.S. Cl. ............... 318/400.01; 318/400; 318/400.13
(58) Field of Classification Search ............. 318/400.01, 318/400, 400.13, 400.15; 720/715
See application file for complete search history.

(56) References Cited

U.S. PATENT DOCUMENTS

| | | | |
|---|---|---|---|
| 7,509,032 B2 | 3/2009 | Jami | |
| 7,564,207 B2 | 7/2009 | Fujimura | |
| 2009/0049463 A1* | 2/2009 | Ueda | 720/695 |

FOREIGN PATENT DOCUMENTS

| | | |
|---|---|---|
| CN | 10452635 C | 1/2009 |
| CN | 10495896 C | 6/2009 |

* cited by examiner

*Primary Examiner* — Karen Masih
(74) *Attorney, Agent, or Firm* — Ming Chow; Sinorica, LLC

(57) ABSTRACT

A brushless DC motor driving system, in which the duty cycle of the PWM control signals for the duty cycle generator is determined by a speed control circuit, a feedback comparator, and the set and reset signals of a S-R Flip-Flop, wherein the PWM control signals pass through the Hall synthesis circuit, the logic control circuit to drive the coil by the drive current generated, and the duty cycle of the PWM control signals is further adjusted by means of the feedback sensing voltage obtained from the driving current and sensing resistance and fed back to the feedback comparator, the stability and linear stability of the input voltage and the driving current being achieved.

20 Claims, 6 Drawing Sheets

BRUSHLESS DC MOTOR DRIVING SYSTEM

BACKGROUND OF THE INVENTION

1. Field of the Invention

The present invention is related to a brushless DC motor driving system, and more particularly, to a brushless DC motor driving system having good linearity, which is used to achieve good low rotation-speed output performance and linear motor rotation speed control, thus enabling the application of such brushless DC motor driving system in Blue-Ray DVD ROM or Light Scribe DVD Player.

2. Description of the Prior Art

Regarding the previous technology for the three-phase motor driving method, related patents such as patents No. CN1989689A and No. CN1914789A have described the motor control method and peek current protection circuit, wherein the synthesis circuit generates different phase modulation signals by phase modulation of the input PWM (Pulse Width Modulation) control signal, and then the PWM output comparator amplifies the phase modulated signal and outputs the amplified signal to the motor control circuit to drive the outside power driving transistor; finally the function of motor control is achieved by driving the motor coil circuit. In addition, for the stability of the rotation speed of motor to be achieved, when the current on the motor coil increases, the rotation speed of motor also increases. Then the Hall elements would sense the current on the coil, transform the sensing current to the sensing voltage, feed back the sensing voltage to the Hall differential control circuit, and adjust the PWM control signals. Meantime, the detection voltage would compare with the reference voltage and input rotation speed control voltage through the feedback comparator, and stable rotation speed control can be achieved.

As shown in FIG. 1, the motor control circuit using a known PWM control method, which comprises a driving motor 2, a power driving transistor 7 and PWM driving control circuit 6, in which the PWM drive control circuit 6 consists of the hall differential amplifier 16, PWM synthesis circuit 17, PWM comparator amplifier 18, reference voltage comparator 24, input rotation speed comparator 13, current detection resistance 12, oscillation prevention capacitor 22, and motor driving control circuit 20. The characteristic of the motor control circuit is to use the PWM signal of the input motor driving control circuit to minus the output RL of the reference voltage comparator and obtain the more real PWM drive control signal for the reason of eliminating the additional conduction time generated by the delay from the oscillation prevention capacitor. The output RL of the reference voltage comparator is generated from the difference between the output of the peek retention circuit and reference voltage, and the input voltage of the peek retention circuit is determined by the current detection resistance 12 and the conduction current controlled by the PWM control signals. During the turn on time of the PWM control signals, the peek retention circuit determines the detection value of the peek voltage, and is discharged with a certain time constant during the off time of the PWM control signals.

Moreover, the input terminal of the input rotation speed comparator 13 is connected with peek detection voltage, reference level voltage, and input control voltage (SIG), so that the lower square wave of the reference level voltage and input control voltage (SIG) is compared with the peek detection voltage. When the input control voltage (SIG) is higher than the peek voltage of the peek retention circuit 14, the output voltage will increase as output voltage (U,V,W) of the synthesis circuit also increases, and then the turn on time of the output PWM control signals of the PWM output comparator 18 in duty cycle also increases. The PWM control signals then pass through the motor driving control circuit 20 to the power driving transistor 7 and drive the three-phase coils on the driving motor, and therefore the driving current on the coil increases and the rotation speed of the motor also increases. Then the driving current passes through the current detection resistance 12 and generates a voltage to be compared with the rotation speed control voltage. After a sequence of feedback control steps, the peek voltage and rotation speed control voltage will become stable.

And vice versa, when the input control voltage decreases, the rotation number of the driving motor 2 also decreases, and the decreased peek voltage will become in accordance with the rotation speed control voltage after the above sequence of control steps is repeated.

However, when the driving motor 2 is overloaded, the rotation number detected by the rotation speed counter decreases. In order to increase the rotation speed of driving motor, the input control signals will be intensified, and the rotation speed of the drive motor 2 also increases, which results in abnormal increase of the rotation control voltage. When the rotation speed control voltage exceeds the reference control voltage, the reference voltage will replace the rotation speed control voltage and become the object of comparison of the input peek voltage of the rotation speed comparator 13, the highest rotation speed thus being limited to avoid excessive driving current which leads to burning out of the current coil of the driving motor. In addition, when the rotation speed voltage exceeds the determined value, once the output voltage of the peek retention circuit becomes higher than the reference voltage, the output of the reference voltage comparator will be at high level, and the additional output turn on time of the PWM output signals of the motor driving control circuit is eliminated. The stability is further strengthened for the rotation speed control voltage and rotation speed of the drive motor.

As in the above-mentioned prior art, the duty cycle of the PWM control signals is determined by the difference between the input control signal (SIG) and the output voltage of the peek retention circuit, and the turn on time of the high electric level is determined by the difference between output voltage of the peek protection circuit and the reference voltage, and finally the consistency is achieved between the duty cycle of PWM control signals and the expected output rotation speed. However, the signal source and signal difference of the PWM control signals synthesized from the difference of the input control signal (SIG) and peek retention circuit and the Hall differential signal are inputted from different feedback paths. Although the input signal of the motor driving control circuit 20 can eliminate the excess delay time of the PWM control signals, the signal is easily induced by the non-linear distortion because of the noise source from different feedback paths.

Since the Blue-Ray DVD ROM is becoming the main stream in the future market, the system requirements on the precision of servo control of the Blue-Ray DVD ROM is higher than those of traditional CD and DVD in regard of the advancement of compression technology and increase of storage capacity. Overall, the control system of the Blue-Ray DVD ROM mainly includes the optical pickup system, servo control, and optical system design. As the servo control is related to the stability of the spindle motor driving system for driving the rotation of the disc and the control of motor driving rotation speed, the circuit design for the motor driving of Blue-Ray DVD ROM of higher storage capacity becomes more important. And more particularly, in the process in which the Blue-Ray DVD ROM picks up signal, higher and stable pick-up speed is needed to facilitate data processing in the optical pick-up process, and the motor must also keep at high driving speed and maintain certain linearity. Since the Blue-Ray DVD ROM needs lower and relatively more stable control in the process of light scribe, particular emphasis needs to be lay on the stability of linearity of the motor driving circuit.

In order to overcome the non-linear distortion problem of the feedback path described above, the present invention provides a brushless DC motor driving system which uses the difference between the input signal and the reference voltage to determine the duty cycle and the turn on time of the PWM control signals; at the same time, the feedback controls of the rotation speed are on the same path, and therefore the best linear ratio of the input voltage to the output rotation speed is obtained.

SUMMARY OF THE INVENTION

Taking the drawback of the prior art into consideration, the present invention first provides a brushless DC motor driving system, the primary objective of which is to achieve the best linearity linear ratio of the input voltage to the output rotation speed of the driving system by using the output digital signal of a S-R Flip-Flop to synchronously adjust the PWM control signals synthesized from the duty cycle generator and logic control circuit.

Another primary objective of the present invention is to achieve good low speed output and linear motor rotation speed control for the driving system by using the output digital signal of a S-R Flip-Flop to synchronously adjust the PWM control signals synthesized from the duty cycle generator and logic control circuit.

According to the above objectives, the present invention first provides a brushless DC motor driving system which includes a parameter generator with its input terminal being connected to a speed control signal and a DC reference voltage, which outputs a speed parameter voltage to an input terminal of a feedback comparator; another input terminal of the feedback comparator is connected to a sensing voltage for outputting a reset signal to an input terminal of a S-R Flip-Flop, another input terminal of the S-R Flip-Flop being connected with the set trigger signal generated from a frequency generator for the S-R Flip-Flop to generate a digital signal. After the digital signal is inputted to a duty cycle generator, the duty cycle generator outputs a DC level modulation voltage. And then three-phase PWM control signals are synthesized from the DC level modulation voltage, the Hall three-phase voltage signals, and the triangular carrier frequency signal generated by the 180 degree phase generator and inputted to an input terminal of a logic control circuit. Another input terminal of the logic control circuit is connected with the digital signal and generates three-phase PWM driving signals, which are inputted to a driving circuit. Wherein the characteristic of the brushless DC motor driving system lies in that: the output digital signal of the S-R Flip-Flop is used to synchronously adjust the PWM control signals synthesized from the duty cycle generator and the logic control circuit.

The present invention then provides a brushless DC motor driving system which includes a parameter generator with its input terminal being connected to a speed control signal and a DC reference voltage, which outputs a speed parameter voltage to an input terminal of a feedback comparator, another input terminal of the feedback comparator being connected to a sensing voltage for outputting a reset signal to an input terminal of a S-R Flip-Flop. Another input terminal of the S-R Flip-Flop is connected with a set trigger signal generated from a frequency generator for the S-R Flip-Flop to generate a digital signal. After the digital signal is inputted to a duty cycle generator, the duty cycle generator outputs a DC level modulation voltage, and then three-phase PWM control signals are synthesized from the DC level modulation voltage, the Hall three-phase voltage, and the triangular carrier frequency generated by the 180 degree phase generator and inputted to an input terminal of a logic control circuit. Another input terminal of the logic control circuit is connected with the digital signal and generates other three-phase PWM driving signals, which are inputted to the driving circuit. Wherein the characteristic of the brushless DC motor driving system lies in that: the sensing voltage inputted to the feedback sensing comparator is used to adjust the output digital signal of the S-R Flip Flop, and the PWM driving signals synthesized from the duty cycle generator and the logic control circuit is further synchronously adjusted.

The present invention further provides a brushless DC motor drive system, including a parameter generator with one input terminal connected to a speed control signal and another input terminal connected to a DC reference voltage, which outputs a speed parameter voltage; a feedback comparator with one input terminal connected to the speed parameter voltage and another input terminal connected to a sensing voltage for outputting a reset signal; a frequency generator which generates a set trigger signal and a triangular carrier frequency signal; a S-R Flip-Flop with one input terminal connected to the reset signal and the another input terminal connected to the reset trigger signal for the S-R Flip-Flop to output a digital signal; a duty cycle generator with one input terminal connected to a digital signal, which outputs a DC level modulation voltage; a 180 degree phase generator with its input terminals connected to the DC level modulation voltage, multiple Hall three-phase voltages, and the triangular carrier frequency signal generated from the frequency generator for outputting three-phase PWM control signals; a logic control circuit with one input terminal connected to the three-phase PWM control signals and another input terminal connected to the digital signal for generating three-phase PWM driving signals; a driving circuit with its input terminals connected to the three-phase PWM driving signals and the sensing voltage, which outputs a three-phase current to a three-phase coil of the brushless DC motor.

DESCRIPTION OF THE PREFERRED EMBODIMENT

Figure 8:
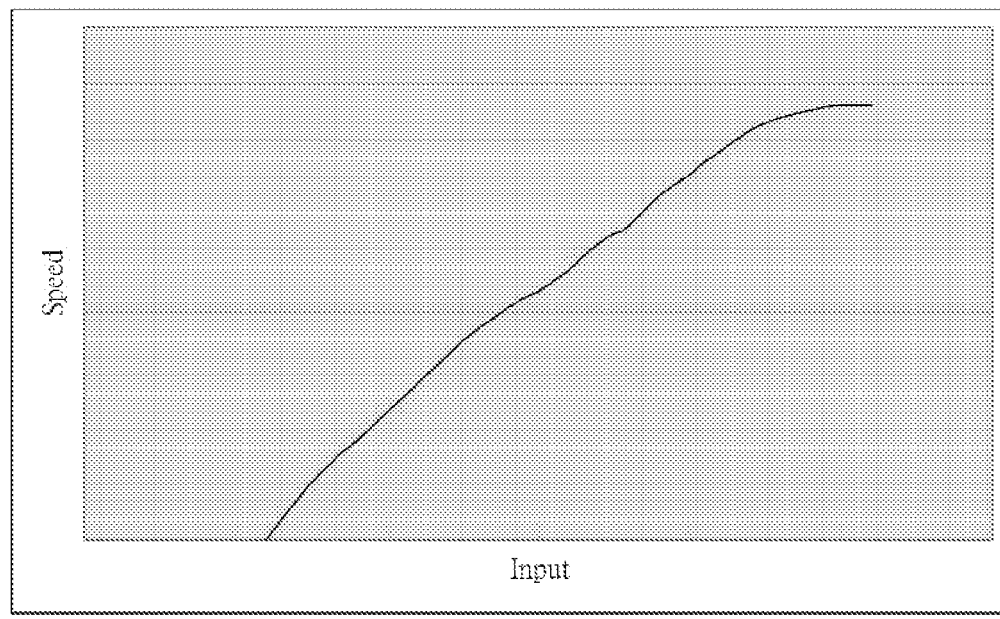
FIG. 8 is the diagram indicating the relationship of the rotation speed and the input voltage of the present invention.

The present invention discloses a brushless DC motor driving system, in which the output digital signal (Vq) of the S-R Flip-Flop is used to synchronously adjust the PWM rectangular control signals synthesized from the duty cycle generator and logic control circuit, and the output digital signal (Vq) of the S-R Flip-Flop is at the same time adjusted by using the feedback sensing voltage obtained from the driving current and sensing current feeds through the feedback comparator circuit, wherein stability of the output voltage and driving current can be maintained and the linearity increased, as indicated in FIG. 8, a diagram showing the relation between rotation speed and input voltage. The circuits employed in the brushless DC motor driving system of the present invention that are related to the prior art, for example, the parameter generator, Hall synthesis circuit, logic control circuit, driving circuit, and three-phase motor, etc., are not completely described in the following. In addition, the three-phase motor in the present invention is the same as the one used in the prior art, so detailed construction of the three-phase motor is not shown in Figure. Other figures referred to in the following description, especially related waveforms, are not drawn according to actual sizes and are used only to illustrate related characteristics of the present invention.

Figure 1:
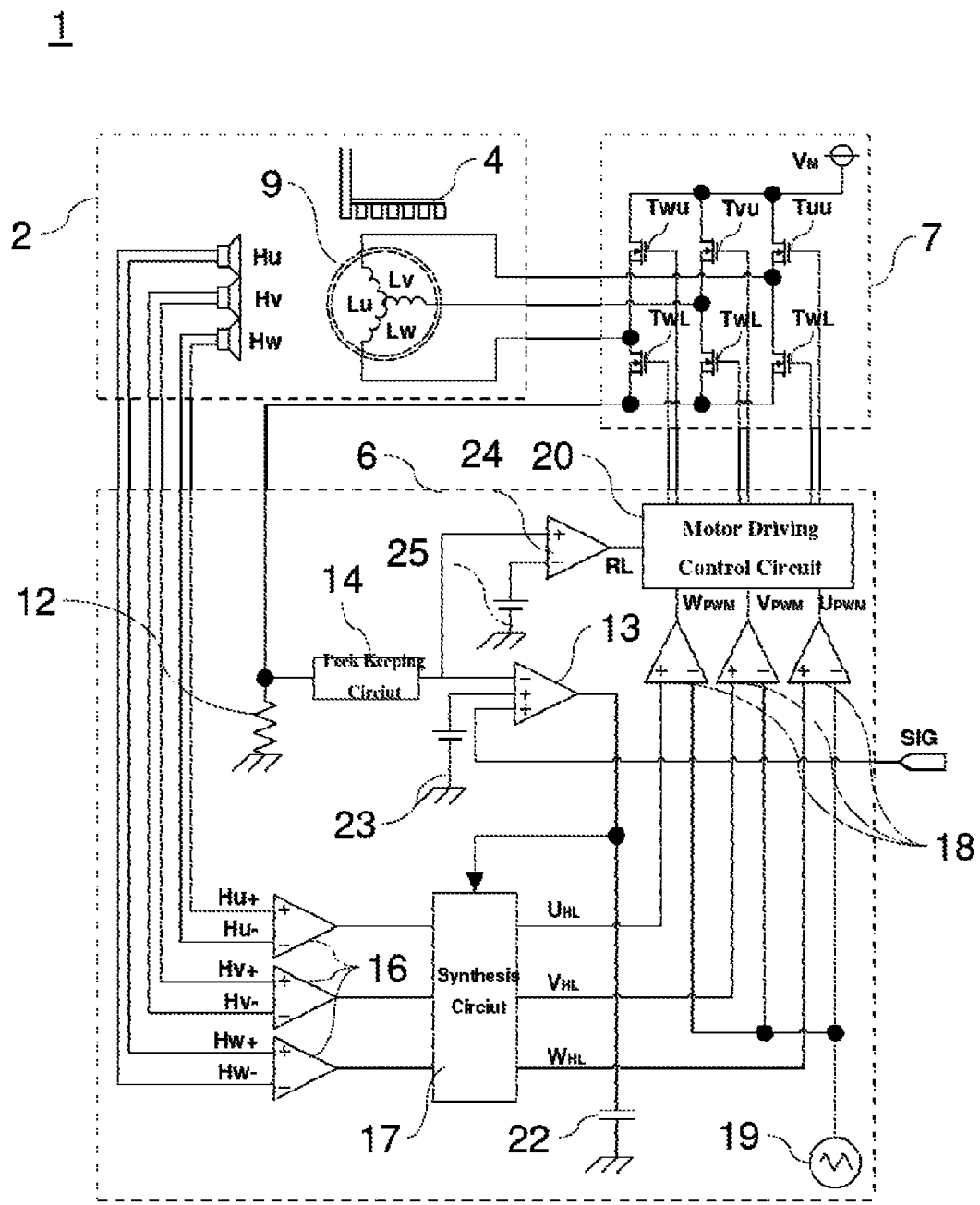
FIG. 1 is a diagram of current driving motor control of the prior art.
Figure 2:
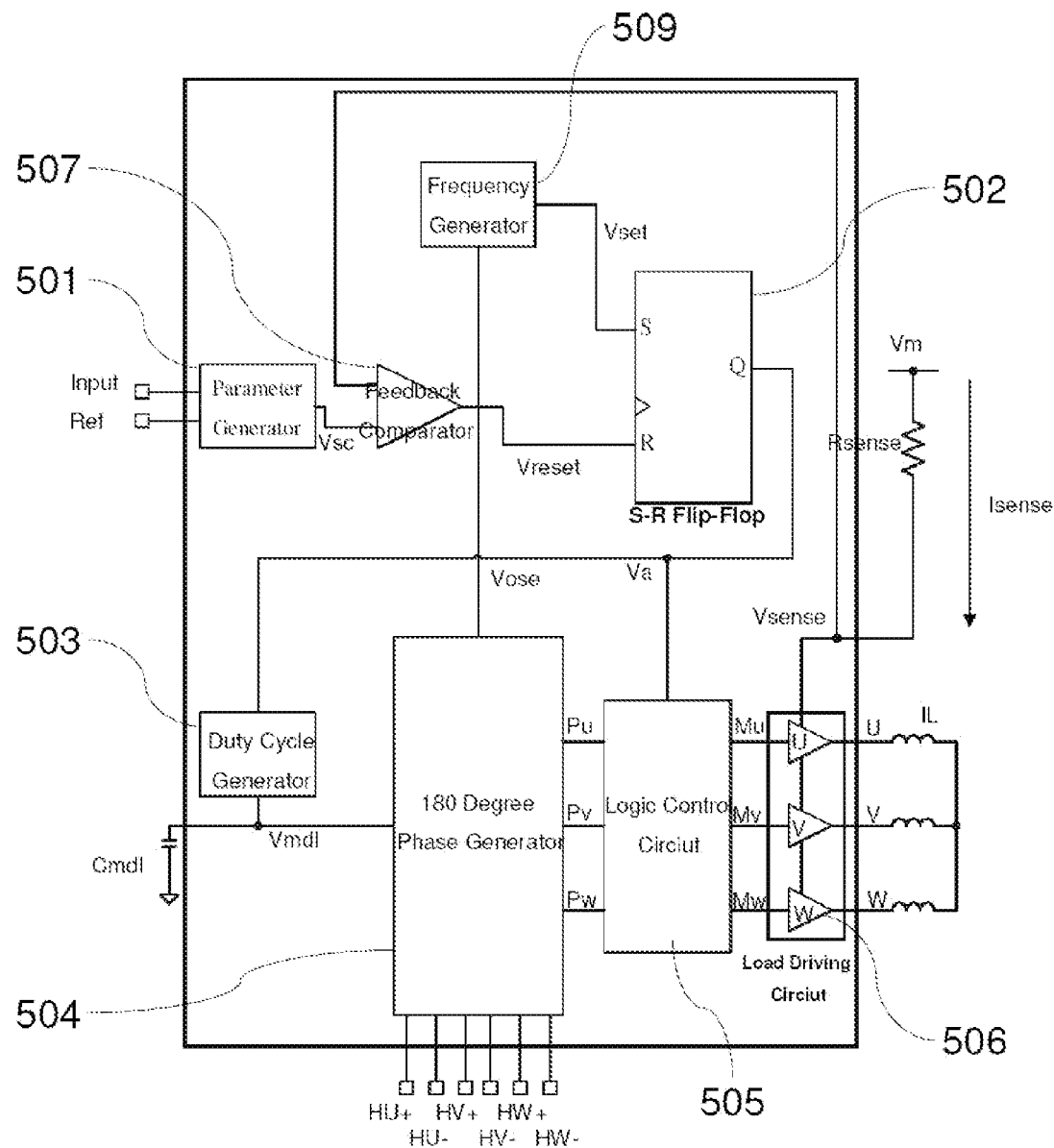
FIG. 2 is a block diagram of brushless DC motor driving of the present invention.

The present invention provides a brushless DC motor driving system, the system structure of which is shown in FIG. 2, comprising a parameter generator 501, feedback comparator 507, frequency generator 509, S-R Flip-Flop 502, duty cycle generator 503, 180 degree phase generator 504, logic control circuit 505, and load driving circuit 506. The major characteristic of which is to use a feedback comparator 507 and a S-R Flip-Flop 502 to determine the output time of the digital voltage (Vq) amplitude of the S-R Flip-Flop, then a DC level modulation voltage (Vmdl) is outputted through the duty cycle generator 503, and a three-phase driving current (IL) is generated through the Hall synthesis circuit to be outputted to the output driving motor.

Figure 3:
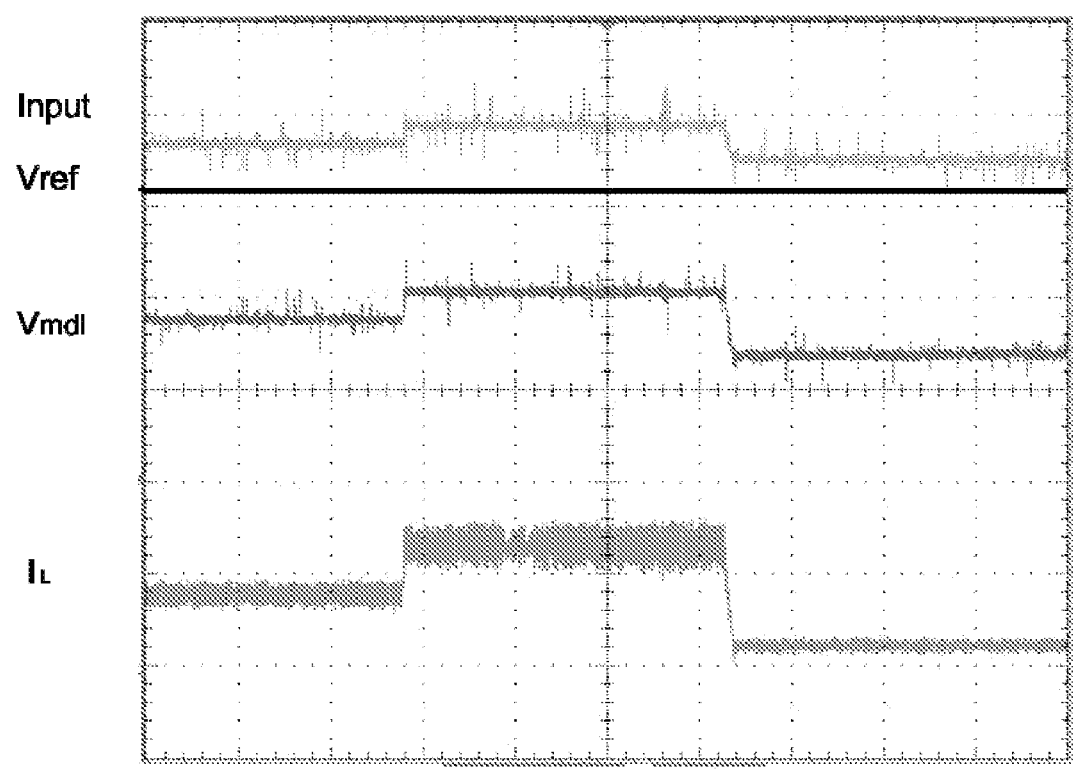
FIG. 3 is a waveform diagram of the input voltage and output current of the present invention.

Referring to FIG. 2 and FIG. 3, wherein FIG. 2 is a block diagram of brushless DC motor driving function and FIG. 3 is a diagram showing the input voltage, modulation voltage, and output current. The parameter generator 501 has two voltage input sources: the first input signal of which is speed control signal (Input) used to control the rotation speed of the motor, the waveform of which being shown in FIG. 3, and the second input signal of which is the DC reference voltage (Ref) used as a DC threshold voltage. The difference between the speed control signal (Input) and the DC reference voltage (Ref) is used for the parameter generator 501 to generate a DC output speed parameter voltage (Vsc) as the input of the feedback comparator 507. Obviously, when the speed control signal (Input) exceeds the DC reference voltage (Vref), the output parameter voltage (Vsc) of the parameter generator 501 increases. Moreover, the parameter generator 501 includes a dead-zone control (not shown in Figure) to prevent small noise signals from affecting normal operation of the system.

The feedback comparator 507 in FIG. 2 is then used to compare two input voltage signals, the first input voltage signal is speed parameter voltage (Vsc), the second input voltage signal is a feedback sensing voltage (Vsense), wherein the feedback sensing voltage (Vsense) is generated by passing a sensing current (Isense) provided by outer voltage (VM) through the sensing resistance (Rsense). When the parameter voltage Vsc and feedback sensing voltage (Vsense) are inputted to the feedback comparator 507, the feedback comparator 507 compares these two voltage signals and generates a reset voltage signal (Vreset) based on the voltage difference between the speed parameter voltage (Vsc) and the feedback sensing voltage (Vsense).

Moreover, the main function of the frequency generator 509 in FIG. 2 is to generate two output signals, wherein one is triangular carrier frequency signal (Vosc) and the other is set trigger signal (Vset). The set trigger signal (Vset) and the reset voltage signal (Vreset) outputted from the feedback comparator 507 are inputted to the S-R Flip-Flop 502. Additionally, the triangular carrier frequency signal (Vosc) is used as the input terminal of the 180 degree phase generator 504. When the input feedback sensing voltage (Vsense) of the feedback comparator 507 is higher than the speed parameter voltage (Vsc), the output reset signal (Vreset) of the feedback comparator 507 will maintain at high voltage level for a long time, and the reset signal Vreset at high level and the set trigger signal Vset generated from the frequency generator 509 are inputted to the S-R Flip-Flop 502.

Then, as shown in FIG. 2, when the input set trigger signal (Vset) of the S-R Flip-Flop is at high voltage level and the reset voltage signal (Vreset) is a negative trigger signal, the output digital signal (Vq) of the S-R Flip-Flop 502 is at low voltage level; when the set trigger signal Vset is a positive signal and the reset signal (Vreset) is at high voltage level, the output digital signal (Vq) of the S-R Flip-Flop is at high voltage level. Thereafter, the output digital signal (Vq) of the S-R Flip-Flop 502 is outputted to the duty cycle generator 503 and logic control circuit 505.

Figure 4:
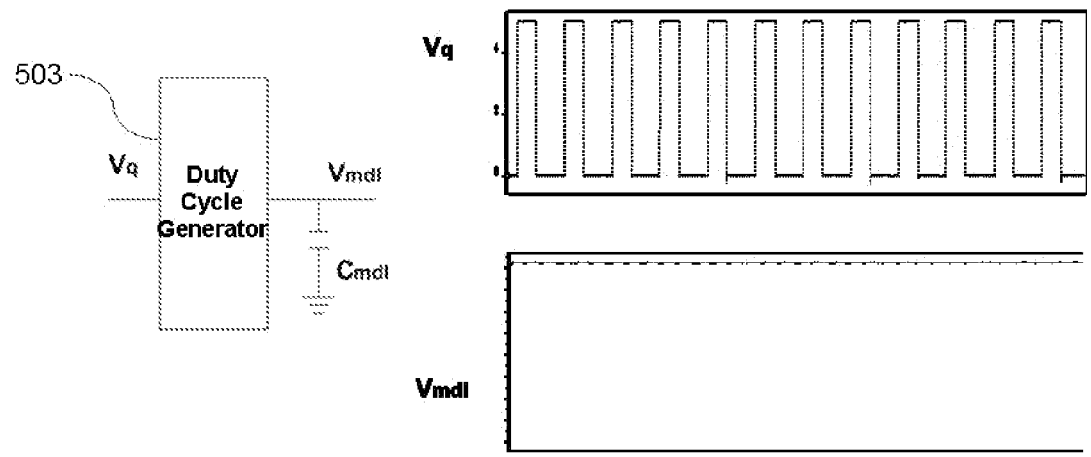
FIG. 4 is a waveform diagram of the input signal and output signal of duty cycle generator of the present invention.

Furthermore, referring to FIG. 2, FIG. 3, and FIG. 4, FIG. 4 shows the waveform for the input signal and output signal of the duty cycle generator of the present invention. Referring to FIG. 2, when the output digital signal (Vq, as shown in the FIG. 4) of the S-R Flip-Flop 502 is inputted to the duty cycle generator 503, the duty cycle generator 503 changes its output duty cycle signal according to different sensing currents and outputs the changed duty cycle signal to the modulation capacitor (Cmdl). The modulation capacitor (Cmdl) outputs and inputs a DC level modulation voltage (Vmdl) to the 180 degree Matrix. As shown in FIG. 4, the strength of regulation of the output DC level modulation voltage (Vmdl) of the duty cycle generator 503 is determined by the high-level portion of the duty cycle of the input digital signal (Vq). For example, when the high-level portion of the duty cycle of the digital signal (Vq) inputted to the duty cycle generator 503 is larger, the voltage level of the output voltage also increases. As another example, when the high-level portion of the duty cycle of the digital signal (Vq) inputted to the duty generator 503 is smaller, the voltage level of the output voltage also decreases. Obviously, the digital signal (Vq) in the present invention is a PWM rectangular control signal, which is used to adjust the strength of regulation of the DC level modulation voltage (Vmdl) outputted by the duty cycle generator 503. Moreover, the purpose of connecting the output of the duty cycle generator 503 to the modulation capacitor (Cmdl) is to stabilize the voltage through a stable DC level modulation voltage (Vmdl) generated by the modulation capacitor (Cmdl), which is then inputted to the 180 degree phase generator 504.

Figure 5:
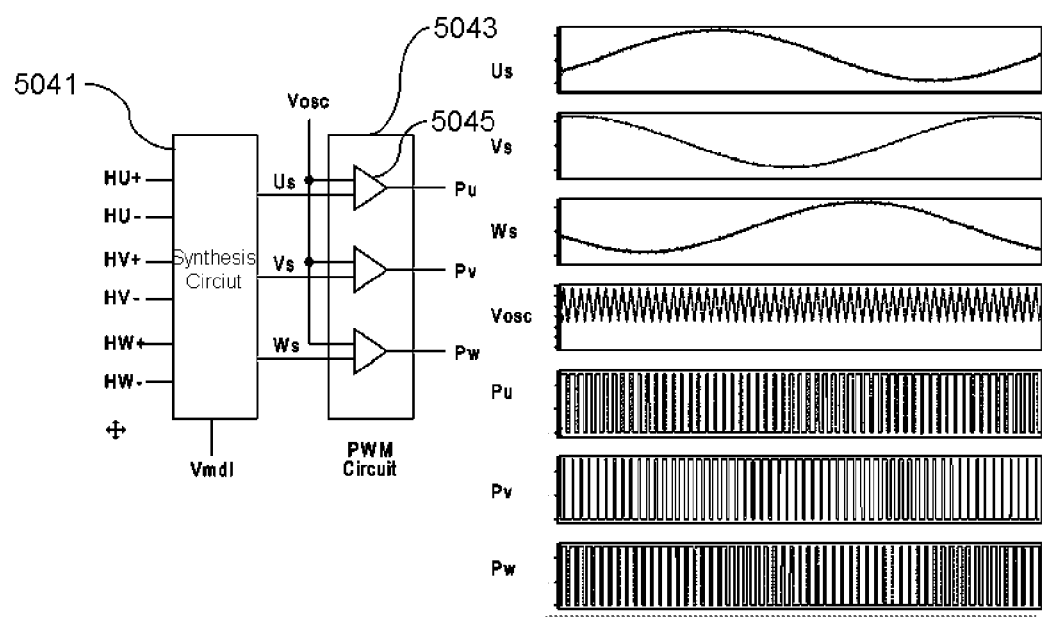
FIG. 5 is a waveform diagram of the input signal and output signal of 180 degree phase generator of the present invention.

Furthermore, as shown in FIG. 2 and FIG. 5, FIG. 5 shows the waveform of the input signal and output signal of the 180 degree phase generator. Referring to FIG. 2, the inputs of the 180 degree phase generator 504 include a modulation voltage (Vmdl) and three-phase Hall signals (HU+, HU−, HV+, HV−, HW+, HW−). The three-phase Hall signals are generated from change in the magnetic field during the motor rotation sensed by Hall elements (not shown in Figure). When the three-phase Hall signals (HU+, HU−, HV+, HV−, HW+, HW−) are inputted to the 180 degree phase generator 504, the 180 degree phase generator will amplify or reduce the three-phase Hall signals (HU+, HU−, HV+, HV−, HW+, HW−) according to the output DC level modulation voltage (Vmdl) of the duty cycle generator 503 to process Pulse Width Modulation (PWM) with triangular carrier frequency signal generated by frequency oscillator 509 for PWM output signals (Pu, Pv, Pw) to be inputted to the logic control circuit 505. More specifically, in a preferred embodiment of the present invention, a 180 degree phase generator 504 comprises a synthesis circuit 5041 and a PWM circuit 5043, as shown in FIG. 5. When the output DC level modulation voltage (Vmdl) of the duty cycle generator 503 is inputted to the synthesis circuit 5041, the three-phase Hall signals (HU+, HU−, HV+, HV−, HW+, HW−) are amplified or reduced according to the DC level modulation voltage (Vmdl) to generate voltage adjustment signals (Us, Vs, Ws), as indicated in FIG. 5. The voltage adjustment signals (Us, Vs, Ws) are then sent to the PWM circuit 5043 for being connected to three comparators 5045 in the PWM circuit 5043; meantime, the output triangular carrier frequency signal (Vosc) of the frequency oscillator 509 is sent to the PWM circuit 5043 for sampling the voltage adjustment signals (Us, Vs, Ws) and outputting three-phase PWM control signals (Pu, Pv, Pw), as shown in FIG. 5. Obviously, the PWM control signals (Pu, Pv, Pw) are PWM rectangular regulator signals. The PWM control signals (Pu, Pv, Pw) are then inputted to the next logic control circuit 505.

Figure 6:
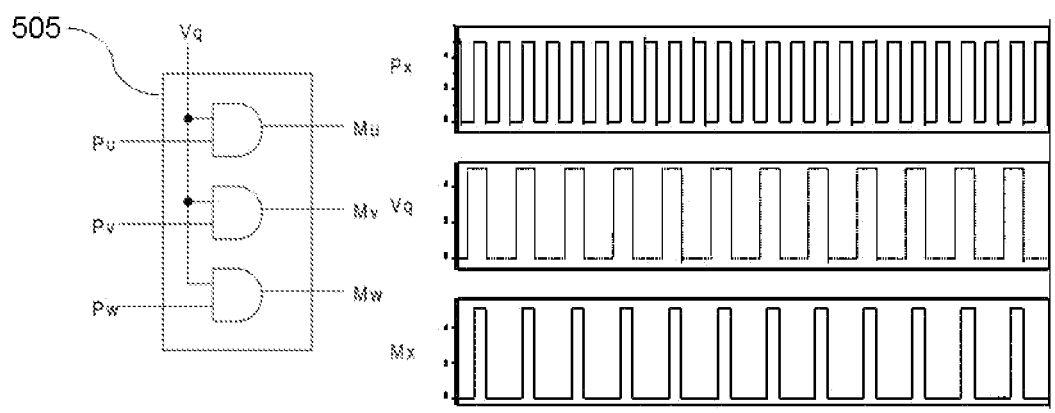
FIG. 6 is a waveform diagram of the input signal and output signal of logic control circuit of the present invention.
Figure 7:
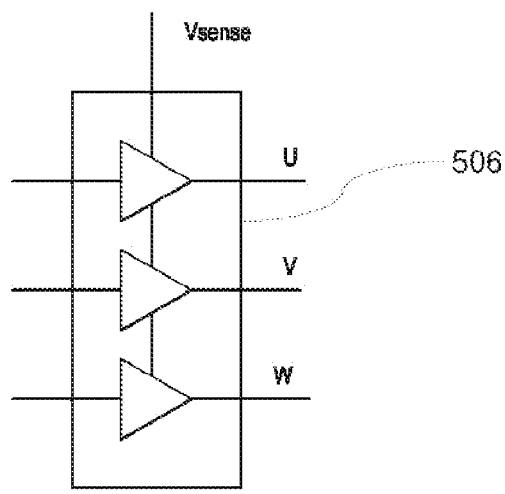
FIG. 7 is a diagram of the driving circuit of the present invention.

Referring then to FIG. 2, FIG. 6, and FIG. 7, FIG. 6 is the waveform of the input signal and output signal of the logic control circuit 505, FIG. 7 is an enlarged diagram of the driving circuit. The logic control circuit 505 has two input voltages, one being the PWM control signals (Pu, Pv, Pw) generated from the 180 degree phase generator 504 and the other being the output digital signal (Vq) of the S-R Flip-Flop. As shown in FIG. 6, the logic control circuit 505 includes 3 AND logic gates, and each of the PWM control signals (Pu, Pv, Pw) is respectively connected to an input terminal of each of the AND logic gates, the other input terminal of each of the AND logic gates being connected to the digital signal (Vq). Each AND logic gate of logic control circuit 505 generates a new rectangular control signal as PWM driving signals (Mu, Mv, Mw) by synthesizing the PWM rectangular regulator signal provided by the PWM control signals (Pu, Pv, Pw) and the rectangular control signal of the PWM digital voltage (Vq). Referring to FIG. 6, in which the waveform of PWM control signals (Pu, Pv, Pw) is shown, wherein Px represents the waveform of any PWM control signals (Pu, Pv, Pw). When any waveform of Px is inputted to the AND logic gate, it is synthesized with the control signal of digital voltage (Vq) to generate the waveform of Mx, Mx being any of PWM driving signals (Mu, Mv, Mw) that correspond to the outputting of each input PWM control signal (Pu, Pv, Pw). Finally, referring to FIG. 7, the PWM driving signals (Mu, Mv, Mw) are connected to the next load driving circuit 506, and the input PWM driving signals (Mu, Mv, Mw) and the feedback sensing voltage (Vsense) of the power supply will be amplified and then outputted to the outside current coils through the load driving circuit 506.

As described above, when the voltage of the speed input signal (Input) exceeds the DC reference voltage (Vref), the output parameter voltage (Vsc) of the parameter generator 501 also increases. Hence, when the parameter voltage (Vsc) is inputted to the feedback comparator 507, the output reset signal (Vreset) of feedback comparator 507 elapses a longer time and feeds to the next S-R Flip-Flop 502, and the turn on time of the output digital signal (Vq) of the S-R Flip-Flop 502 also increases. Subsequently, when the digital signal (Vq) feeds to the duty cycle generator 503, the output DC level modulation voltage (Vmdl) of the duty cycle generator 503 increases. Then the DC level modulation voltage (Vmdl) and the three-phase Hall voltage signals (HU+, HU−, HV+, HV−, HW+, HW−) are inputted to the 180 degree phase generator 504, and the synthesized rectangular regulator PWM control signals (Pu, Pv, Pw) are connected to the logic control circuit 505; the logic control circuit 505 generates a set of new PWM control rectangular waveforms to be the PWM driving signals (Mu, Mv, Mw), which are then connected to the load driving circuit 506. Finally, the load driving circuit 506 outputs PWM driving signals (Mu, Mv, Mw) of 3 different phase and induces driving current of outside signal. Hence, as shown in FIG. 3, the DC level modulation voltage (Vmdl) and the driving current (IL) would increase or decrease according to the change of the speed control voltage (Input).

Further, as shown in FIG. 2, when the driving current (IL) increases, the feedback sensing voltage (Vsense) decreases because of the voltage drop. When the feedback sensing voltage (Vsense) is connected to the feedback comparator 507 through the feedback path, the feedback sensing voltage (Vsense) is compared with the speed parameter voltage (Vsc). When the speed parameter voltage (Vsc) is at low voltage level, the duration of time at high voltage level for the reset signal (Vreset) increases, which results in the increase of the driving current (IL) and thus the increase of voltage drop of the sensing resistance (Rsense), finally resulting in the decrease of the feedback sensing voltage (Vsense). When the feedback sensing voltage (Vsense) is close to the speed parameter voltage (Vsc), the input reset signal (Vreset) of the S-R Flip-Flop 502 is at low voltage level and the output DC level modulation voltage (Vmdl) of the duty cycle generator 503 maintains at certain level. Finally, the DC level modulation voltage (Vmdl) and the Hall control signals will feed through the 180 degree phase generator 504, and then the modulated PWM control signals (Pu, Pv, Pw) feed through the logic control circuit 505 and driving circuit 506. Thereafter the sensing current (Isense) of the feedback circuit will achieve its limit value and become stable.

When the output PWM driving signals (Mu, Mv, Mw) of the logic control circuit 505 pass through the driving circuit 506 and are synthesized with feedback sensing voltage (Vsense) of the power supply, the driving circuit 506 generates the output voltage (U, V, W) and the driving current (IL) for driving the rotation of the motor. The output digital signal (Vq) of the S-R Flip-Flop 502 of the present invention is used to adjust the PWM rectangular control signal synthesized from the duty cycle generator 503 and logic control circuit 505 to be PWM driving signals (Mu, Mv, Mw). Meantime, the feedback sensing voltage obtained from the driving current (IL) and sensing current (Isense) feeds back to the feedback comparator 507 and is used to adjust the output digital signal (Vq) of the S-R Flip-Flop 502, and the output voltage (U, V, W) and the driving current (IL) will remain stable and the linearity increases as shown in FIG. 8 that shows the relationship between the rotation speed and input voltage. Since the linearity for the output voltage (U, V, W) and the driving current (IL) increases, accurate motor control and output control for low rotation speed can be achieved by the brushless DC driving system of the present invention.

The Blue-Ray DVD ROM system (not shown in Figure) includes pick-up head system, spindle motor for driving the rotation of disc, servo control system, and the blue light emitting device, wherein the brushless DC driving system disclosed by the present invention can be used as servo control system of Blue-Ray DVD ROM. Since the servo control system is related to the stability of the spindle motor for driving the rotation of the disc and the control of the rotation speed of motor driving, when the motor driving system with high linearity provided by the present invention is used as the spindle motor of a Blue-Ray DVD ROM, the linearity of motor can be increased in the high-speed rotation process of signal pick-up or in the process of low-speed rotation of Light-Scribing. That is, the motor driving system of Blue-Ray DVD ROM as provided by the present invention ensures good linearity, which thus increases the reliability of Blue-Ray DVD ROM.

The description above is for explaining the preferred embodiments of the present invention and is not for limiting the scope of application. It is possible to make some modifications according to the above description or embodiments of the present invention. Hence, the spirit and the scope of the present invention are determined by the following claims and its equivalence.

What is claimed is:

1. A brushless DC motor driving system, comprising a parameter generator with its input terminals being connected to a speed control signal and a DC reference voltage, which outputs a speed parameter voltage to an input terminal of a feedback comparator, another input terminal of said feedback comparator being connected to a sensing voltage for outputting a reset signal to an input terminal of a S-R Flip-Flop, another input terminal of said S-R Flip-Flop being connected to an output set trigger signal of a frequency generator, an output digital signal of said S-R Flip-Flop being inputted to a duty cycle generator, an output DC level modulation voltage of said duty cycle generator and three-phase Hall voltage signals and triangular carrier frequency signal of said frequency generator being connected to a 180 degree phase generator which generates three-phase PWM control signals that are connected to an input terminal of a logic control circuit, another input terminal of said logic control circuit being connected to said digital signal, and three-phase PWM driving signals outputted by said logic control circuit being connected to a driving circuit (506), wherein the characteristic of said brushless DC motor driving system lies in that:
said output digital signal of said S-R Flip-Flop is used to synchronously adjust said PWM driving signals synthesized from said duty cycle generator and said logic control circuit.

2. The brushless DC motor driving system according to claim 1, wherein said output digital signal of said S-R Flip-Flop is a PWM rectangular control signal.

3. The brushless DC motor driving system according to claim 1, wherein said 180 degree phase generator comprises a Hall synthesis circuit and a PWM circuit.

4. The brushless DC motor driving system according to claim 3, wherein input terminal of said Hall synthesis circuit is connected to said three-Phase Hall voltage signals and said DC level modulation voltage, an output three-phase voltage adjustment signal is connected to said PWM circuit, and said three-phase PWM control signals generated by said PWM circuit are synthesized from said triangular carrier frequency signal and said three-phase voltage adjustment signal.

5. The brushless DC motor driving system according to claim 1, wherein said sensing voltage is generated by a current provided by an outer voltage source through a resistance.

6. The brushless DC motor driving system according to claim 1, wherein said sensing voltage is further connected to said driving circuit.

7. A brushless DC motor driving system, comprising a parameter generator with its input terminals being connected to a speed control signal and a DC reference voltage, which outputs a speed parameter voltage to an input terminal of a feedback comparator, another input terminal of said feedback comparator being connected to a sensing voltage for outputting a reset signal to an input terminal of a S-R Flip-Flop, another input terminal of said S-R Flip-Flop being connected to an output set trigger signal of a frequency generator, an output digital signal of said S-R Flip-Flop being inputted to a duty cycle generator, an output DC level modulation voltage of said duty cycle generator and three-phase Hall voltage signals and triangular carrier frequency signal of said frequency generator being connected to a 180 degree phase generator which generates three-phase PWM control signals that is connected to an input terminal of a logic control circuit, another input terminal of said logic control circuit being connected to said digital signal, and three-phase PWM driving signals outputted by said logic control circuit being connected to a driving circuit, wherein the characteristic of said brushless DC motor driving system lies in that:
said sensing voltage inputted to said feedback comparator is used to synchronously adjust said output digital signal of said S-R Flip-Flop and is further used to synchronously adjust said PWM driving signals synthesized from said duty cycle generator and said logic control circuit.

8. The brushless DC motor driving system according to claim 7, wherein said output digital signal of said S-R Flip-Flop is a PWM rectangular control signal.

9. The brushless DC motor driving system according to claim 7, wherein said 180 degree phase generator comprises a Hall synthesis circuit and a PWM circuit.

10. The brushless DC motor driving system according to claim 9, wherein input terminal of said Hall synthesis circuit is connected to said three-Phase Hall voltage signals and said DC level modulation voltage, an output three-phase voltage adjustment signal is connected to said PWM circuit, and said three-phase PWM control signals generated by said PWM circuit is synthesized from said triangular carrier frequency signal and said three-phase voltage adjustment signal.

11. The brushless DC motor driving system according to claim 7, wherein said sensing voltage is generated by a current provided by an outer voltage source through a resistance.

12. The brushless DC motor driving system according to claim 7, wherein said sensing voltage is further connected to said driving circuit.

13. A brushless DC motor driving system, comprising,
a parameter generator, one input terminal of which being connected to a speed control signal and another input terminal of which being connected to a DC reference voltage, outputting a speed reference voltage;
a feedback comparator, one input terminal of which being connected to said speed parameter voltage and another input terminal of which being connected to a sensing voltage, outputting a reset signal;
a frequency generator, generating a set trigger signal and a triangular carrier frequency signal;
a S-R Flip-Flop, one input terminal of which being connected to said reset signal and another input terminal of which being connected to said set trigger signal for said S-R Flip-Flop to output a digital signal;
a duty cycle generator, one input terminal of which being connected to said digital signal, outputting a DC level modulation voltage;
a 180 degree phase generator, input terminals of which being connected to said DC level modulation voltage, a plurality of three-phase Hall voltage, and said triangular carrier frequency signal for outputting three-phase PWM control signals;
a logic control circuit, one input terminal of which being connected to said three-phase PWM control signals and another input terminal of which being connected to said digital signal for generating three-phase PWM driving signals; and a driving circuit, one input terminal of which being connected to said three-phase PWM driving signals and said sensing voltage, outputting a three-phase current to a three-phase coil of brushless DC motor.

14. The brushless DC motor driving system according to claim 13, wherein said output digital signal of said S-R Flip Flop is a PWM rectangular control signal.

15. The brushless DC motor driving system according to claim 13, wherein said 180 degree phase generator comprises a Hall synthesis circuit and a PWM circuit.

16. The brushless DC motor driving system according to claim 15, wherein input terminal of said Hall synthesis circuit is connected to said three-phase Hall voltage signals and said DC level modulation voltage, an output three-phase voltage adjustment signal of said three-phase Hall voltage is connected to said PWM circuit, and said three-phase PWM control signals generated by said PWM circuit are synthesized from said triangular carrier frequency signal and said three-phase voltage adjustment signal.

17. The brushless DC motor driving system according to claim 13, wherein said sensing voltage is generated by a current provided by an outer voltage source through a resistance.

18. The brushless DC motor driving system according to claim 13, wherein said sensing voltage is further connected to said driving circuit.

19. A Blue-Ray DVD ROM, comprising an optical pick-up system, a spindle motor for driving the rotation of disc, a brushless DC motor driving system, and a blue light emitting device, said brushless DC motor driving system of said Blue-Ray DVD ROM comprising a parameter generator, input terminals of which being connected to a speed control signal and a DC reference voltage, an output speed parameter voltage of said parameter generator being connected to an input terminal of a feedback comparator, another terminal of said feedback comparator being connected to a sensing voltage for an output reset signal of said feedback comparator to be connected to an input terminal of a S-R Flip Flop, another input terminal of said S-R Flip Flop being connected to output set trigger signal of a frequency generator for an output digital signal of said S-R Flip-Flop to be connected to a duty cycle generator, said duty cycle generator outputting a DC level modulation voltage; said output DC level modulation voltage, said three-phase Hall voltage signals, and said output triangular carrier frequency signal of said frequency generator being inputted to a 180 degree phase generator to synthesize three-phase PWM control signals that are to be connected to an input terminal of said logical control circuit;

another input terminal of said logic control circuit being connected to said digital signal to generate three-phase PWM driving signals, said three-phase PWM driving signals being connected to a driving circuit, wherein the characteristic of said brushless DC motor driving system lies in that:

said output digital signal of said S-R Flip-Flop is used to synchronously adjust said PWM driving signals synthesized from said duty cycle generator and said logic control circuit.

20. The Blue-Ray DVD ROM according to claim 19, wherein said input sensing voltage of said feedback comparator is used to adjust said output digital signal, Vq, of said S-R Flip-Flop and further synchronously adjust said PWM driving signals synthesized from said duty cycle generator and said logic control circuit.

* * * * *